Patented Sept. 18, 1945

2,385,224

UNITED STATES PATENT OFFICE 2,385,224

SULPHA-THIAZOLES

George Newbery, Hutton Mount, England, assignor, by mesne assignments, to Merck & Co. Inc., Rahway, N. J., a corporation of New Jersey No Drawing. Original application May 29, 1939, Serial No. 276,416, now Patent No. 2,362,087, dated November 7, 1944. Divided and this application February 3, 1944, Serial No. 520,951. In Great Britain, Australia, Barbados, Canada, Denmark, Finland, India, New Zealand, Norway, and Sweden, June 3, 1938

7 Claims. (Cl. 260—239.6)

This application is a division of Serial No. 276,416, filed on May 29, 1939.

The present invention relates to the preparation of 2-(p-amino-benzene-sulphonamido) derivatives of thiazole and benzthiazole and their substituted derivatives, many of which have been found to be of therapeutic importance, and has for its object the preparation of substituted p-amino-benzene-sulphonamido derivatives of thiazole and benzthiazole of the general formula

p—NH₂C₆H₄SO₂NRR¹ in which R=hydrogen or an alkyl or aralkyl group and R¹ is a thiazole residue

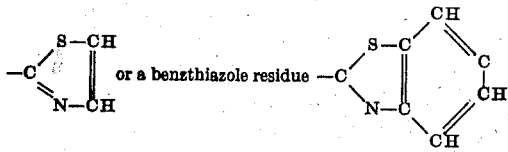

in which one or more of the hydrogen atoms may be substituted by any of the following groups nitro, amino, acylamino, alkyl, aryl, alkoxyl, hydroxy-alkyl, or carbalkyloxy.

According to the present invention these compounds may be prepared by methods which are summarised as follows:

(A) Derivatives in which R=hydrogen may be prepared by condensing compounds of the type p—XC₆H₄Y with compounds of the type ZR¹ in which R¹ is a thiazole or benzthiazole residue (when Y is SO₂Cl, Z is NH, and when Y is SO₂NH₂, Z is a halogen) to form compounds of the type p—XC₆H₄SO₂NHR¹, which can readily be converted into compounds of the type

p—NH₂C₆H₄SO₂NHR¹,

X therefore represents an acyl-amino group, a nitro group, an azo group linked to an organic radicle, or a halogen, which groups may readily be converted to an amino group, by hydrolysis in the first case, by reduction in the second and third cases or by the action of ammonia in the fourth case.

(B) Derivatives in which R is alkyl or aralkyl may be obtained by the action of alkyl sulphates on the amino derivatives obtained by any of the methods described in paragraph (A) or by the action of alkyl or aralkyl halides or alkyl sulphates on the intermediate condensation products obtained as described in paragraph (A) and subsequently converting the acylamino group by hydrolysis, the nitro or azo groups by reduction or the halogen groups by ammonia to compounds of the type p—NH₂C₆H₄SO₂NRR¹.

(C) In place of the compounds p—XC₆H₄SO₂Cl the anhydrides (p—XC₆H₄SO₂)₂O or the bromides p—XC₆H₄SO₂Br may also be used.

The following examples illustrate how the invention may be carried out in practice, but it is to be understood that the invention is in no way limited to the details given in these examples.

Example 1

50 grammes of 2-amino-thiazole are dissolved in 200 c. c. of anhydrous pyridine and a slight excess (130 grammes) of dry p-acetylamino-benzene-sulphonyl chloride is slowly added. Some heat is produced and when the mixture begins to cool it is heated for a few minutes to complete the reaction and a large volume of water is added. The precipitated oily 2-(p-acetylaminobenzene sulphonamido) thiazole quickly solidifies and is crystallised from solution in warm caustic soda by acidification with 50% acetic acid. The purified product melts at 256° C.

For hydrolysis the product is taken up in a volume of 2N caustic soda equal to 10 times its weight and the mixture heated at 100° C. for an hour. Concentrated hydrochloric acid is then added until the solid at first precipitated has redissolved. The solution is treated with charcoal, filtered and the requisite 2(p-amino benzene sulphonamido) thiazole M. Pt. 196–197° C. is precipitated in a crystalline condition by the addition of sodium acetate.

Example 2

7.5 grammes of 2-amino-4-methyl-thiazole-hydrochloride are finely powdered and suspended in 15 c. c. dry pyridine and 13 grammes of p-bromobenzene-sulphonyl chloride slowly added at a temperature of 30–40° C. After heating for a few minutes on the steam bath to complete the reaction, the whole is poured into a large excess of water and the product ground with 50% aqueous acetic acid to remove gummy by-products. The 2-(p-bromobenzene sulphonamido)-4-methyl-thiazole thus obtained is recrystallised from dilute acetic acid and has M. P. 165–166° C.

The bromo compound is mixed with 10 volumes of 0.880 ammonia and one twentieth of its weight of cuprous chloride and the mixture heated in a closed vessel at 120° C. On filtration and removal of excess of ammonia by boiling, 2-(p-aminobenzene sulphonamido)-4-methyl-thiazole separates after the removal of a little gummy impurity, and is purified by one of the methods described in Example 4.

Example 3

28 grammes of azo-benzine-p-sulphonyl chloride is added to a suspension of 15 grammes of 2-amino-4-methyl-thiazole hydrochloride in 50 c. c. dry pyridine without external cooling. The mixture is warmed on the steam bath to complete the reaction and poured into water. Crystallisation from 80% acetic acid gives 2-(p-azo-benzenesulphonamido) 4-methyl-thiazole M. Pt. 208° C.

9 grammes of the azo compound are stirred with 30 c. c. of 2N.NaOH, diluted with warm water till solution is effected, and 9 grammes of Raney nickel catalyst suspended in alcohol added. The mixture is shaken under a pressure of hydrogen of 50 lbs./square inch until the theoretical absorption is attained. The catalyst is removed by filtration and on acidification with acetic acid 2-(p-amino-benzene-sulphonamido) - 4 - methyl-thiazole separates in a practically pure state. (M. Pt. 239–240° C.).

Example 4

To a solution of 114 grammes of 2-amino-4-methyl-thiazole in 250 c. c. of dry pyridine, 250 grammes of p-acetylamino-benzene-sulphonyl chloride is slowly added with stirring at a temperature of 50–60° C. The resulting reddish-brown syrupy solution is then heated for 1 hour at 100° C. and poured into a mixture of 300 c. c. concentrated hydrochloric acid, 1 litre of water and 500 grammes of ice. The precipitated crude 2-(p-acetylamino benzene sulphonamido) - 4-methyl-thiazole is filtered off, washed with water and boiled under reflux for 20 minutes with 300 c. c. of concentrated hydrochloric acid diluted with an equal volume of water.

The solution so obtained is diluted with water and the 2-(p-amino-benzene-sulphonamido)-4-methyl-thiazole precipitated by making alkaline with sodium carbonate. The product may be purified by crystallisation from various solvents (such as acetone or methyl-glycol) or by precipitation of the sodium salt by an excess of caustic soda or by saturation with sodium chloride and liberating the pure product by addition of acid. The pure product is a white crystalline powder M. Pt. 240° C.–241° C.

Example 5

To 11.4 grammes of 2-amino-5-methyl-thiazole (dissolved in 25 c. c. of dry pyridine), 24 grammes of p-acetylamino-benzene-sulphonyl chloride is slowly added. The temperature of the mixture is allowed to rise to 50–60° C. during the course of the addition and then raised to 100° C. for fifteen minutes. When cool the whole is added to water and the 2-(p-acetylaminobenzene-sulphonamido)-5-methyl-thiazole which separates is crystallised by solution in hot dilute sodium hydroxide and addition of excess of acetic acid.

After boiling with 10 volumes of 2N sodium hydroxide for 45 minutes acidification with hot 50% acetic acid precipitates 2-(p-amino-benzenesulphonamido)-5-methyl thiazole. The product is best purified by precipitation of its hydrochloride from its aqueous solution by addition of sodium chloride. The hydrochloride is then reconverted to the base (M. Pt. 243° C.) by boiling with dilute aqueous sodium acetate.

Example 6

To 16.5 grammes of 2-amino-4:5-dimethyl-thiazole hydrochloride in 30 c. c. dry pyridine is slowly added 40 grammes of p-nitro-benzene-sulphonic anhydride, the temperature being kept below 60° C. After heating for a few minutes on the steam bath, water is added and the precipitated 2-(p-nitro-benzene-sulphonamido)-4:5-dimethyl-thiazole recrystallised from 80% acetic acid. The same product M. Pt. 232° C. (with decomposition) results from the action of 24 grammes of p-nitrobenzene sulphonyl chloride under similar conditions.

5 grammes of the nitrocompound are dissolved in 20 c. c. of N.NaOH and the solution added to a ferrous hydroxide paste made by the addition of 10 grammes of caustic soda in 30 c. c. water to a solution of 33 grammes of crystalline ferrous sulphate in 130 c. c. water. After warming for a few minutes to coagulate the precipitated hydrated ferric oxide, the mixture is filtered and the filtrate acidified with 50% acetic acid. The precipitated product is warmed with 15% hydrochloric acid, some insoluble material removed by filtration and 2-(p-aminobenzene-sulphonamido)-4:5-dimethyl-thiazole precipitated by the addition of sodium acetate. The product melts at 246° C.

Example 7

19 grammes of 2-amino-4-methyl-5-phenyl-thiazole is condensed with 23.3 grammes of p-acetylamino-benzene-sulphonyl chloride in 60 c. c. pyridine. The reaction mixture is poured into an excess of 10% hydrochloric acid and after standing overnight is filtered off and washed with water. The crude 2-p-acetylamino-benzene-sulphonamido-4-methyl-5-phenyl-thiazole is hydrolysed by boiling for 2 hours with 2N NaOH. A small amount of insoluble material is removed by shaking with ether, the solution acidified with acetic acid and the precipitated 2(p-amino-benzene-sulphonamido) 4-methyl-5-phenyl-thiazole purified by dissolving in ammonia, treating with charcoal, filtering, and reprecipitating with acetic acid. The pure product melts at 140° C. (decomp.).

Example 8

17.6 grammes of 2-amino-4-phenyl-thiazole (Traumann Ann. 249, 39) are dissolved in 45 c. c. of pyridine and 23.3 grammes of p-acetylamino-benzene-sulphonyl chloride added with stirring during the course of half an hour. Reaction is completed by heating for 1 hour on the water bath and the still warm reaction mixture poured into an excess of dilute HCl, the precipitate filtered off and washed. The product is hydrolysed by boiling with 2N NaOH for 2 hours and the resulting solution made acid with acetic acid. 2-(p-amino-benzene-sulphonamido)-4-phenyl-thiazole is precipitated and, after purification by conversion to the sodium salt, liberating the free acid and recrystallising, melts at 190° C.

Example 9

53 grammes of 2-amino-4-methyl-5-hydroxy-ethyl-thiazole prepared by the condensation of thiourea with 3 chloro-3-aceto-propan-1-ol is dissolved in 50 c. c. of water and 23.3 grammes of p-acetyl-amino-benzene-sulphonyl chloride is added with stirring over a period of half an hour at 15° C. and stirring continued for about 24–48 hours at the ordinary temperature. The product is filtered off, washed with water, and hydrolysed by boiling with 15 times its weight of 35% methane sulphonic acid for 3 minutes. The solution is diluted, neutralised with soda and reacidified with dilute acetic acid. The 2(p-amino-benzene-sulphonamido)-4-methyl-5-hydroxy-ethyl-thiazole melts when rapidly heated at 141° or by slow heating at 174–176° C.

Example 10

To 37.2 grammes of 2-amino-4-methyl-5-carbethoxy-thiazole (Conrad. Ber. 29, 1896, 1042) suspended in 65 c. c. of dry pyridine at 50° C. are added 48 grammes of p-acetyl-amino-benzene-sulphonyl chloride in small quantities at a time. There is some rise of temperature and complete solution is rapidly obtained. After 15 minutes on the steam bath the product is precipitated by pouring into water, and purified by grinding with dilute hydrochloric acid and crystallisation from 50% acetic acid. The 2-(p-acetylamino-benzene-sulphonamido)-4-methyl-5-carbethoxy-thiazole so obtained has M. Pt. 249° C. (with decomposition).

The acetylamino compound is boiled for 1½ hours with ten volumes of 15% hydrochloric acid and an equal volume of methanol. On cooling 2-(p-amino-benzene-sulphonamido)-4-methyl-5-carbethoxy-thiazole hydrochloride, M. Pt. 240° C. (decomp.), separates. This on treatment with sodium carbonate or sodium acetate gives the free base which is purified by crystallisation from alcohol and then has M. Pt. 195° C. On hydrolysis with 2N caustic soda and acidifying with acetic acid 2-(p-amino-benzene-sulphonamido)-4-methyl-5-carboxy-thiazole is obtained M. Pt. 190° C. (decomp.).

Example 11

21.4 grammes p-acetylamino-benzene-sulphonamide and an equal weight of 2-bromo-benzthiazole are intimately mixed with the addition of 7 grammes dry powdered potassium carbonate and 0.5 gramme copper bronze. The mixture so obtained is stirred for one hour at 200° C. under reflux. The melt is then lixiviated with water and the filtered aqueous solution acidified with excess of acetic acid. The required 2-(p-acetylamino-benzene-sulphonamido)-benzthiazole separates and after crystallisation from acetic acid has M. Pt. 286° C.

Hydrolysis of the acetyl group is effected by boiling the crude acetyl compound with about 10 volumes of concentrated hydrochloric acid and 20 volumes of methanol under reflux. The hydrochloride which separates on cooling is suspended in hot methanol and poured into excess of boiling half saturated solution of sodium acetate. The required 2-(p-amino-benzene-sulphonamido)-benzthiazole then crystallises in colourless plates M. Pt. 298° C.

Example 12

15.0 grammes of 2-amino-benzthiazole is dissolved in 50 c. c. pyridine and 24 grammes of p-acetylamino-benzene-sulphonyl chloride slowly added. When addition is complete the mixture is further heated at 100° C. for a few minutes and poured into water. The precipitated crude 2-(p-acetylamino-benzene-sulphonamido)-benzthiazole is boiled with ten volumes of 2N caustic soda for 2 hours and acidified with concentrated hydrochloric acid. The product is 2-(p-amino-benzene-sulphonamido)-benzthiazole M. Pt. 298° C.

Example 13

19.4 grammes of 2-amino-6-ethoxy-benzthiazole dissolved in 50 c. c. of dry pyridine are treated by the slow addition of 24 grammes of p-acetyl-aminobenzene-sulphonyl chloride, the temperature rising to 50–60° C. After warming to complete the reaction the mixture is poured into water and the crude 2-(p-acetylamino-benzene-sulphonamido)-6-ethoxy-benzthiazole purified by solution in caustic alkali and reprecipitation from the hot solution by excess of acetic acid. After a further crystallisation from 80% acetic acid it has M. Pt. 280–281° C.

The reprecipitated acetyl derivative is suspended in ten volumes of alcohol and dry hydrochloric acid gas passed in to saturation. On boiling, solution is effected and in a short time the hydrochloride of the base separates. This is dissolved in methyl alcohol and the alcoholic solution added to an excess of sodium acetate in boiling aqueous solution.

2-(p-aminobenzene-sulphonamido)-6-ethoxy-benzthiazole separates in colourless prisms M. Pt. 257° C.

Example 14

To 9.75 grammes of 2-amino-6-nitro-benzthiazole suspended in 30 c. c. of dry pyridine are added 12 grammes of p-acetylamino-benzene-sulphonyl chloride. Solution is completed by heating on the steam bath. The crude 2-(p-acetylamino-benzene-sulphonamido)-6-nitro-benthiazole precipitated on addition of water is purified by extraction with 2N sodium hydroxide and acidification of the hot alkaline extract with 50% acetic acid. The purified product forms bright yellow prisms M. Pt. 303° C.

Hydrolysis of the acetyl group ensues on 30 minutes boiling with 10 volumes of 2N caustic soda. The crude amino compound precipitated on acidification is purified by conversion to the hydrochloride by warming with 15% hydrochloric acid. The hydrochloride is filtered off, dissolved in excess of ammonia and reprecipitated by addition of acetic acid. The pure 2-(p-amino-benzene-sulphonamido)-6-nitro-benzthiazole so obtained melts at 292° C.

Example 15

21 grammes of 2-amino-5-acetylamino-benzthiazole are suspended in 50 c. c. of dry pyridine at 40° C. and 25 grammes of p-acetylamino-benzene-sulphonyl chloride slowly added. After 30 minutes heating at 100° C. the mixture is added to water and the precipitated 2-(p-acetylamino-benzene-sulphonamido)-5-acetylamino-benzthiazole crystallised by addition of acetic acid to a hot solution in dilute caustic soda. Hydrolysis is effected by boiling with 10 volumes of 2N sodium hydroxide for 40 minutes. Acidification with acetic acid then precipitates 2-(p-amino-benzene-sulphonamido)-5-amino-benzthiazole M. Pt. 270° C.

Example 16

20.7 grammes of 2-amino-5-acetylaminobenzthiazole are suspended in 50 c. c. dry pyridine and treated with 23 grammes of p-nitrobenzene-sulphonyl chloride at 40–50° C. After warming to complete the reaction, the product is precipitated by pouring into water and crystallised by addition of hot acetic acid to a hot solution in dilute caustic soda.

The 2-(p-nitrobenzene-sulphonamido)-5-acetylamino-benzthiazole formed is mixed with twice its weight of finely divided iron powder and the mixture added to very dilute boiling acetic acid. After making just alkaline with caustic soda and further boiling, ferric oxide is removed by filtration and the filtrate acidified with acetic acid. The crude 2-(p-aminobenzene-sulphonamido)-5-acetylamino-benzthiazole is purified by solution in a large excess of N-hydrochloric acid, followed by addition of sodium acetate. After removal of a less pure fraction while hot, the pure product crystallises out on cooling. It melts at 265° C.

Example 17

3.3 grammes of 2-(p-brom-benzene-sulphonamido)-4-methyl-thiazole are taken up in 10 c. c. of 2N sodium hydroxide and stirred with 2 c. c. methyl sulphate for 1 hour, further 2N sodium hydroxide being added when necessary to ensure the alkalinity of the mixture. On cooling in ice 2-(p-brom-benzene-sulphon-methylamido)-4-methyl-thiazole separates and after two crystallisations from spirit has M. Pt. 172° C.

Heated under pressure for 5 hours at 150° with 10 volumes of concentrated aqueous ammonia in the presence of 1/20 of its weight of cuprous chloride a solid product separates. After crystallisation from methyl alcohol pure 2-(p-amino-benzene-sulphon-methyl-amido)-4-methyl-thiazole M. Pt. 206° C. is obtained.

Example 18

23 grammes of 2-amino-5-methyl-thiazole are dissolved in 100 c. c. of pyridine and 46 grammes of p-nitrobenzene-sulphonyl chloride slowly added. After heating for 15 minutes on the steam bath, the mixture is poured into water and the precipitated 2-(p-nitro-benzene-sulphonamido)-5-methyl-thiazole crystallised by addition of its hot solution in caustic soda to a large excess of boiling dilute acetic acid. The product M. Pt. 255° C. (dec.) is taken up in N sodium hydroxide (2 mols) and boiled under reflux for 1 hour with an excess of ethyl iodide. The heavy oily layer which separates quickly crystallises and the product 2-(p-nitro-benzene-sulphon-ethylamido)-5-methyl-thiazole after recrystallisation from 80% alcohol melts at 175°.

4 grammes mixed with 8 grammes of fine iron powder is slowly added to 150 c. c. boiling water containing a little acetic acid. The mixture is made alkaline with ammonia and again boiled. Alcohol is then added to the extent of about one quarter of the total volume and the hot mixture filtered from iron oxide. 2-(p-amino-benzene-sulphon-ethylamido)-5-methyl-thiazole immediately separates from the filtrate. For purification a few drops of 15% hydrochloric acid are added to a suspension of the base in hot alcohol. The solution so obtained on addition of excess sodium acetate deposits the pure base M. Pt. 193–4° C.

Example 19

To a solution of 7.8 grammes of 2-(p-acetylamino-benzene-sulphonamido)-4-methyl-thiazole in 15 c. c. of 2N,NaOH is added 20 c. c. of benzyl-chloride with vigorous stirring which is continued while the temperature is raised to 50° C. for one hour. One volume of water and two volumes of ether are then added and the solid which separates, 2-(p-acetylamino-benzene-sulphon-benzylamido)-4-methyl-thiazole, purified by extraction with hot spirit and crystallisation from acetic acid.

4.5 grammes of the product is boiled for 1½ hours with 100 c. c. of 15% hydrochloric acid and the hydrochloride which separates on cooling decomposed by boiling with dilute aqueous sodium acetate, containing some acetic acid. 2-(p-amino-benzene-sulphon-benzyl-amido) - 4 - methyl-thiazole thus obtained after crystallisation from 90% alcohol has M. Pt. 215–216° C.

Example 20

13.5 grammes of 2-(p-amino-benzene-sulphonamido)-4-methyl-thiazole is dissolved in 25 c. c. of 2NNaOH and 6 c. c. of dimethyl sulphate added with mechanical stirring and ice cooling. A further quantity of 2NNaOH is added during the addition to maintain alkalinity together with a little methyl alcohol to break up the solid lumps which tend to be formed towards the end of the addition. The crude 2-(p-aminobenzene-sulphon-methylamido)-4-methyl-thiazole obtained on filtration is recrystallised from 80% alcohol. It melts at 205–206° C.

Example 21

3.5 grammes of 2-(p-acetylamino-benzene-sulphonamido)-benzthiazole are taken up in 25 c. c. of N. sodium hydroxide and the solution stirred at room temperature with 2.5 c. c. of diethyl sulphate for one hour. After standing, the solid which separates is well washed with dilute sodium hydroxide and with water and finally boiled with 15 c. c. of methylated spirit, cooled and filtered. The 2-(p-acetylamino-benzene-sulphonethylamido)-benzthiazole so obtained is then refluxed with 20 volumes of 15% hydrochloride acid for one and a half hours and the hydrochloride which separates on cooling removed by filtration. This on boiling with equal volumes of alcohol and 15% aqueous ammonia gives the required 2-(p-amino-benzene-sulphon-ethylamido)-benzthiazole which after crystallisation from alcohol has M. Pt. 209–210° C.

Example 22

3.1 grammes of 2-(p-amino-benzene-sulphonamido)-benzthiazole are dissolved in 25 c. c. of N. NaOH, 2.5 c. c. of diethyl sulphate added, and the mixture stirred vigorously for one hour. After standing, the crystals which separate are removed and washed with dilute sodium hydroxide and with water. Repeated crystallisation from alcohol gives 2-(p-aminobenzene-sulphon-ethylamido)-benzthiazole M. Pt. 209–210° C.

Example 23

8.9 grams of 5-methyl-2-bromthiazole (prepared from the corresponding 2-amino compound by Sandmeyer's method) are intimately mixed with 10 grams of p-nitrobenzene-sulphonamide, 4.5 grams of anhydrous potassium carbonate and 1 gram of copper powder (copper bronze) and the mixture heated for 1 hour at 180° C. and temperature then raised to 200° C. for 15 minutes. When cold the melt is lixiviated with hot water and subsequently with 2N sodium hydroxide. The latter extract is then heated with charcoal, filtered and acidified with acetic acid whereby 5-methyl-2-(p-nitro-benzene-sulphonamido)-thiazole is precipitated in crystalline condition. Melting point 254° C. (dec.).

5 grams of the product so obtained is suspended in 50 c. c. of water and dissolved by the addition of 20 c. c. of 2N sodium hydroxide and 11 grams of sodium hyposulphite slowly added with stirring and addition of further 2N sodium hydroxide as necessary to maintain a clear solution. The mixture is heated in the steam bath for a few minutes to complete reaction, acidified strongly with hydrochloric acid and boiled for some minutes.

Sulphur and other impurities are removed by filtration after further boiling with charcoal and the practically colourless solution neutralised to Congo red by the addition of sodium acetate.

2-(p-aminobenzene-sulphonamido)-5-methyl-thiazole crystallises out on cooling and is purified as described in Example 5.

What I claim and desire to secure by Letters Patent is:

1. As a new chemical compound 2-(p-amino-benzenesulphonamido) - 4-methyl-5-carbethoxy-thiazole.

2. 2-(p-amino-benzenesulphonamido)-4-methyl-5-carboxy-thiazole.

3. A 2-sulphanilamido-thiazole of the formula:

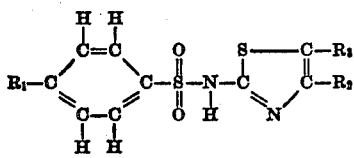

in which $R_1$ is a member of the group consisting of an amino group, an acylamino group, and a nitro group, and in which $R_2$ is a member of the group consisting of hydrogen and an alkyl radical, and $R_3$ is a member of the group consisting of carboxyl and carbalkyloxy radicals.

4. Process for the production of a 2-sulphanil-amido-thiazole of the formula

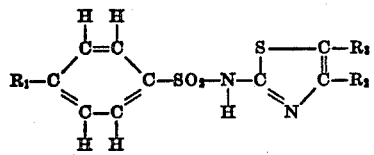

in which $R_1$ is a member of the group consisting of an acylamino group hydrolyzable to an amino group and a nitro group reducible to an amino group, and in which $R_2$ is a member of the group consisting of hydrogen and an alkyl radical, and $R_3$ is a member of the group consisting of hydrogen, alkyl, carboxyl, carbalkyloxy, hydroxyalkyl, and phenyl radicals, which comprises reacting p-$R_1$-benzene-sulphonamide, in which $R_1$ has the aforesaid value, with a 2-halo-thiazole of the formula

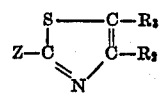

in which $R_2$ and $R_3$ have the aforesaid values and Z is a halogen, in the presence of potassium carbonate and copper.

5. Process for the preparation of 2-(p-amino-benzene-sulphonamido)-thiazole, which comprises heating a mixture of p-acetylamino-benzene-sulphonamide and 2-halo-thiazole in the presence of a mixture of potassium carbonate and copper powder, extracting 2(p-acetylamino-benzene-sulphonamido)-thiazole from the reaction product, and converting the acylamino group in the resulting compound to an amino group by hydrolysis.

6. Process for the preparation of 2-(p-amino-benzene-sulphonamido)-thiazole, which comprises heating a mixture of p-nitro-benzene-sulphonamide and 2-halo-thiazole in the presence of a mixture of potassium carbonate and copper powder, extracting 2-(p-nitro-benzene-sulphonamido)-thiazole from the reaction product, and reducing the nitro group in the resulting compound to form an amino group.

7. Process for the preparation of 2-(p-amino-benzene-sulphonamido)-5-methyl-thiazole, which comprises heating a mixture of p-nitro-benzene-sulphonamide and 5-methyl-2-bromthiazole in the presence of a mixture of potassium carbonate and copper powder, extracting 2-(p-nitro-benzene-sulphonamido)-5-methyl-thiazole from the reaction product, and reducing the nitro group in the resulting compound to form an amino group.

GEORGE NEWBERY.